(12) United States Patent
Koshisaka

(10) Patent No.: US 6,629,109 B1
(45) Date of Patent: Sep. 30, 2003

(54) SYSTEM AND METHOD OF ENABLING FILE REVISION MANAGEMENT OF APPLICATION SOFTWARE

(75) Inventor: Yoshihiro Koshisaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/517,695

(22) Filed: Mar. 2, 2000

(30) Foreign Application Priority Data

Mar. 5, 1999 (JP) .......................................... 11-058564

(51) Int. Cl.[7] .............................................. G06F 17/30
(52) U.S. Cl. ...................... 707/203; 707/200
(58) Field of Search ............................... 707/102, 200, 707/8, 202, 201, 203, 204; 711/162; 713/193; 395/500, 182.04

(56) References Cited

U.S. PATENT DOCUMENTS

| | | | | |
|---|---|---|---|---|
| 5,202,982 A | * | 4/1993 | Gramlich et al. | 707/200 |
| 5,504,886 A | * | 4/1996 | Chang et al. | 707/102 |
| 5,603,020 A | * | 2/1997 | Hashimoto et al. | 707/200 |
| 5,627,996 A | * | 5/1997 | Bauer | 395/500 |
| 5,675,725 A | * | 10/1997 | Malcolm | 395/182.04 |
| 5,754,848 A | * | 5/1998 | Hanes | 707/200 |
| 5,778,395 A | * | 7/1998 | Whiting et al. | 707/204 |
| 5,848,418 A | * | 12/1998 | De Souza et al. | 707/102 |
| 5,991,772 A | * | 11/1999 | Doherty et al. | 707/202 |
| 6,088,694 A | * | 7/2000 | Burns et al. | 707/8 |
| 6,101,585 A | * | 8/2000 | Brown et al. | 711/162 |
| 6,134,660 A | * | 10/2000 | Bonch et al. | 713/193 |
| 6,185,574 B1 | * | 2/2001 | Howard et al. | 707/200 |
| 6,453,325 B1 | * | 9/2002 | Cabrera et al. | 707/204 |

FOREIGN PATENT DOCUMENTS

| | | |
|---|---|---|
| JP | 1-195559 | 8/1989 |
| JP | 1-315844 | 12/1989 |
| JP | 4-178846 | 6/1992 |
| JP | 4-369745 | 12/1992 |
| JP | 7-64838 | 3/1995 |

OTHER PUBLICATIONS

Richard M. Stallman/translated by Toru Takizawa, GNU Emacs 19 Manual, Japan, Addison Wesley Publishers Japan, Oct. 31, 1997, 1st edition, pp. 93–121.

* cited by examiner

Primary Examiner—Safet Metjahic
Assistant Examiner—Thuy Pardo
(74) Attorney, Agent, or Firm—Sughrue Mion, PLLC

(57) ABSTRACT

A file revision management system for executing file revision management when an application operating on an operating system of a computer system saves a file by file overwrite includes a file manipulation monitoring section and a processing section implemented by memory-resident software, for example. The file manipulation monitoring section monitors and hooks API (Application Program Interface) commands outputted by the application to the operating system, and thereby detects file manipulation executed by the application. The processing section executes file manipulation necessary for file revision management (i.e., file deletion and file name change for generating a backup file) and processes necessary for file revision management, depending on the file manipulation executed by the application detected by the file manipulation monitoring section. As a result, file revision management is implemented even if the application is not provided with functions for file revision management, thereby file backup reliability of applications is improved.

33 Claims, 4 Drawing Sheets

FIG. 3

DELETED FILE NAME MEMORY SECTION 23

| DELETED FILE NAME | BACKUP FILE NAME |
|---|---|
| org.doc | org_19980930_1730.doc |
| tmp1.doc | tmp1_19980930_1729.doc |
| tmp2.doc | tmp2_19980930_1728.doc |
| ⋮ | ⋮ |

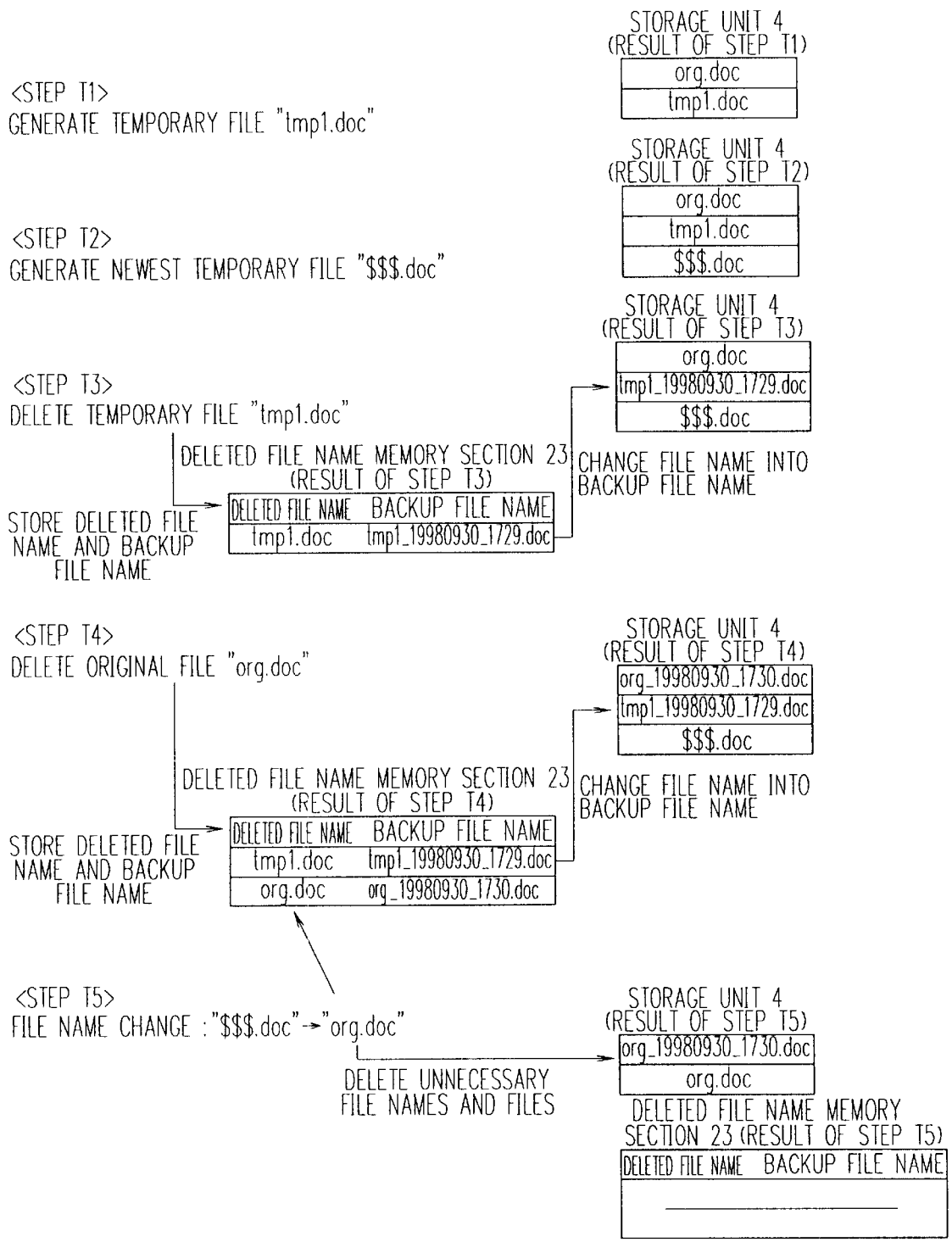

SYSTEM AND METHOD OF ENABLING FILE REVISION MANAGEMENT OF APPLICATION SOFTWARE

BACKGROUND OF THE INVENTION

The present invention relates to a system and a method for enabling file revision management of application software even if the application software is not originally provided with functions for file revision management.

DESCRIPTION OF THE PRIOR ART

Various studies have been carried out with regard to backup management of files in computer systems. For example, in Japanese Patent Application Laid-Open No.HEI4-369745 concerning program development application software, a candidate (provisional) backup file is automatically saved when a predetermined condition is satisfied or when a predetermined time has passed in the use of the program development application software by a user, and the candidate backup file is saved as an actual backup file if the candidate backup file could actually be compiled and executed normally. In the conventional file backup management method, candidate backup files that could not be compiled or executed normally are abandoned, and thereby necessary storage capacity in the computer system is reduced.

Meanwhile, some applications (application software) of nowadays are being provided with file revision management functions as file backup management functions. By the file revision management functions of the application software of nowadays, a historical log of file deletion and file name change by the user is maintained, and files which have been deleted or whose names have been changed by the user are also maintained (stored in a record medium such as an HDD (Hard Disk Drive)) so that each file can arbitrarily been loaded again when necessary. As is widely known, the file revision management functions have been implemented in applications such as "Microsoft Word" (Microsoft Corporation) as built-in functions of the application.

However, these days, computers have become capable of starting two or more application programs concurrently and the users of the computers have a tendency to use two or more applications in parallel or simultaneously. Therefore, the aforementioned file revision management functions which are provided to only limited applications are not enough nor efficient in the computer usage environment of these days. Further, if the file revision management is executed by a plurality of application programs independently, wasteful repetition of file revision management operations occurs between the application programs, and thereby waste of operations, cost, etc. occurs between the application programs.

SUMMARY OF THE INVENTION

It is therefore the primary object of the present invention to provide a file revision management system and a file revision management method, by which file revision management can be implemented even if the applications are not provided with file revision management functions, and thereby file backup reliability of the applications can be improved.

Another object of the present invention is to provide a file revision management system and a file revision management method, by which file revision management of a plurality of applications can be executed by a common file revision manager, and thereby the efficiency of the file revision management for applications can be improved and manufacturing cost of the applications can be reduced.

In accordance with a first aspect of the present invention, there is provided a file revision management system for executing file revision management when an application which is operating on an operating system of a computer system saves a file by means of file overwrite. The file revision management system comprises a file manipulation monitoring means and a processing means. The file manipulation monitoring means monitors and hooks API (Application Program Interface) commands which are outputted by the application to the operating system and thereby detects file manipulation which is going to be executed by the application. The processing means executes file manipulation necessary for the file revision management such as file deletion and file name change for generating a backup file and processes necessary for the file revision management, depending on the file manipulation which is going to be executed by the application which has been detected by the file manipulation monitoring means.

In accordance with a second aspect of the present invention, in the first aspect, when the file manipulation detected by the file manipulation monitoring means is "file deletion" of a file having a name An which has been stored in a storage unit of the computer system, the processing means changes the name of the file An stored in the storage unit into a corresponding backup file name Bn instead of actually deleting the contents of the deleted file An from the storage unit, and stores the deleted file name An in a deleted file name memory means. When the file manipulation detected by the file manipulation monitoring means is "file name change" from a file name C into a file name D, the processing means judges whether or not each of the deleted file names An stored in the deleted file name memory means matches the file name D after the file name change, and regards a file in the storage unit corresponding to a deleted file name An that matched the file name D after the file name change as the object of reserve, and regards files in the storage unit corresponding to deleted file names An that did not match the file name D after the file name change as unnecessary temporary files.

In accordance with a third aspect of the present invention, in the second aspect, in the case where the file manipulation detected by the file manipulation monitoring means is "file name change", with regard to the unnecessary temporary files, the processing means deletes the unnecessary temporary files from the storage unit and deletes deleted file names An corresponding to the unnecessary temporary files from the deleted file name memory means. With regard to the object of reserve, the processing means does not delete the object of reserve from the storage unit and deletes a deleted file name An corresponding to the object of reserve from the deleted file name memory means. The processing means changes the file name of the newest temporary file which has been generated by the application for the file overwrite into the file name D after the file name change.

In accordance with a fourth aspect of the present invention, in the third aspect, when a deleted file name An is stored in the deleted file name memory means by the processing means, the processing means also stores the corresponding backup file name Bn in the deleted file name memory means, and when a deleted file name An is deleted from the deleted file name memory means by the processing means, the processing means also deletes the corresponding backup file name Bn from the deleted file name memory means.

In accordance with a fifth aspect of the present invention, in the third aspect, the processing means executes the file deletion and the file name change with respect to the storage unit by sending API commands for the file deletion and the file name change to the operating system.

In accordance with a sixth aspect of the present invention, in the second aspect, the backup file name Bn includes the date and time concerning the "file deletion".

In accordance with a seventh aspect of the present invention, in the sixth aspect, the backup file name Bn further includes part of the name An of the deleted file An.

In accordance with an eighth aspect of the present invention, in the second aspect, the deleted file name memory means is implemented by memory of the computer system.

In accordance with a ninth aspect of the present invention, in the second aspect, the deleted file name memory means is implemented by an HDD (Hard Disk Drive) of the computer system.

In accordance with a tenth aspect of the present invention, in the first aspect, when the file manipulation detected by the file manipulation monitoring means is "file deletion" of a file which has been stored in a storage unit of the computer system, the processing means changes the name of the file stored in the storage unit into a corresponding backup file name instead of actually deleting the contents of the deleted file from the storage unit.

In accordance with an eleventh aspect of the present invention, in the first aspect, the file manipulation monitoring means judges which of two or more applications operating on the computer system outputted the API command based on an ID (IDentifier) included in the API command. The processing means executes the file manipulation and the processes necessary for the file revision management for the two or more applications respectively and independently based on the ID.

In accordance with a twelfth aspect of the present invention, in the first aspect, the file revision management system is started up on the computer system for each application operating on the operating system, independently.

In accordance with a thirteenth aspect of the present invention, there is provided a file revision management method for executing file revision management when an application which is operating on an operating system of a computer system saves a file by means of file overwrite. The file revision management method comprises a file manipulation monitoring step and a processing step. In the file manipulation monitoring step, API (Application Program Interface) commands which are outputted by the application to the operating system are monitored and hooked and thereby file manipulation which is going to be executed by the application is detected. In the processing step, file manipulation necessary for the file revision management such as file deletion and file name change for generating a backup file and processes necessary for the file revision management are executed depending on the file manipulation which is going to be executed by the application which has been detected in the file manipulation monitoring step.

In accordance with a fourteenth aspect of the present invention, in the processing step of the thirteenth aspect, when the file manipulation detected in the file manipulation monitoring step is "file deletion" of a file having a name An which has been stored in a storage unit of the computer system, the name of the file An stored in the storage unit is changed into a corresponding backup file name Bn instead of actually deleting the contents of the deleted file An from the storage unit, and the deleted file name An is stored in a deleted file name memory means. When the file manipulation detected in the file manipulation monitoring step is "file name change" from a file name C into a file name D, it is judged whether or not each of the deleted file names An stored in the deleted file name memory means matches the file name D after the file name change, and a file in the storage unit corresponding to a deleted file name An that matched the file name D after the file name change is regarded as the object of reserve, and files in the storage unit corresponding to deleted file names An that did not match the file name D after the file name change are regarded as unnecessary temporary files.

In accordance with a fifteenth aspect of the present invention, in the processing step in the fourteenth aspect, in the case where the file manipulation detected in the file manipulation monitoring step is "file name change", the unnecessary temporary files are deleted from the storage unit and deleted file names An corresponding to the unnecessary temporary files are deleted from the deleted file name memory means, and the object of reserve is not deleted from the storage unit and a deleted file name An corresponding to the object of reserve is deleted from the deleted file name memory means, and the file name of the newest temporary file which has been generated by the application for the file overwrite is changed into the file name D after the file name change.

In accordance with a sixteenth aspect of the present invention, in the processing step in the fifteenth aspect, when a deleted file name An is stored in the deleted file name memory means, the corresponding backup file name Bn is also stored in the deleted file name memory means, and when a deleted file name An is deleted from the deleted file name memory means, the corresponding backup file name Bn is also deleted from the deleted file name memory means.

In accordance with a seventeenth aspect of the present invention, in the fifteenth aspect, the file deletion and the file name change which are executed in the processing step with respect to the storage unit are implemented by sending API commands for the file deletion and the file name change to the operating system.

In accordance with an eighteenth aspect of the present invention, in the fourteenth aspect, the backup file name Bn includes the date and time concerning the "file deletion".

In accordance with a nineteenth aspect of the present invention, in the eighteenth aspect, the backup file name Bn further includes part of the name An of the deleted file An.

In accordance with a twentieth aspect of the present invention, in the fourteenth aspect, the deleted file name memory means is implemented by memory of the computer system.

In accordance with a twenty-first aspect of the present invention, in the fourteenth aspect, the deleted file name memory means is implemented by an HDD (Hard Disk Drive) of the computer system.

In accordance with a twenty-second aspect of the present invention, in the thirteenth aspect, when the file manipulation detected in the file manipulation monitoring step is "file deletion" of a file which has been stored in a storage unit of the computer system, the name of the file stored in the storage unit is changed into a corresponding backup file name instead of actually deleting the contents of the deleted file from the storage unit.

In accordance with a twenty-third aspect of the present invention, in the file manipulation monitoring step of the thirteenth aspect, it is judged which of two or more applications operating on the computer system outputted the API command, based on an ID (IDentifier) included in the API command. In the processing step, the file manipulation and the processes necessary for the file revision management are executed for the two or more applications respectively and independently based on the ID.

In accordance with a twenty-fourth aspect of the present invention, in the thirteenth aspect, the file revision management method is executed for each application operating on the operating system, independently.

In accordance with twenty-fifth through thirty-sixth aspects of the present invention, there are provided computer-readable record mediums storing programs for instructing a computer system to execute the file revision management methods of the thirteenth through twenty-fourth aspects of the present invention.

BRIEF DESCRIPTION OF THE DRAWINGS

The objects and features of the present invention will become more apparent from the consideration of the following detailed description taken in conjunction with the accompanying drawings, in which:

FIG. 3 is a schematic diagram showing deleted file names and backup file names which are stored in a deleted file name memory section of the file revision management system; and FIG. 4 is a schematic diagram showing a concrete example of the operation of the computer system of FIG. 1.

DESCRIPTION OF THE PREFERRED EMBODIMENTS

Figure 1:
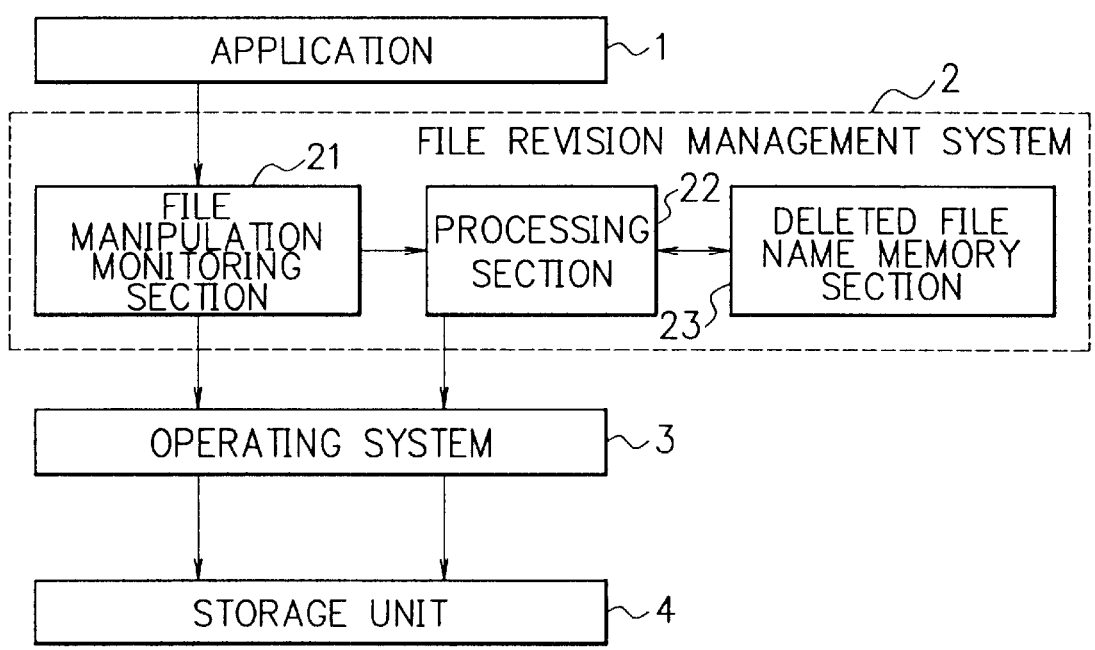
FIG. 1 is a schematic block diagram showing an example of a computer system in which a file revision management system in accordance with an embodiment of the present invention is employed.

Referring now to the drawings, a description will be given in detail of preferred embodiments in accordance with the present invention.

FIG. 1 is a schematic block diagram showing an example of a computer system in which a file revision management system in accordance with an embodiment of the present invention is employed.

Referring to FIG. 1, the computer system includes an application 1, a file revision management system 2, an operating system 3 and a storage unit 4.

The application 1 is generally-used application software which operates on the computer system, such as word processor software, spreadsheet software, CAD (Computer-Aided Design) software, etc. The file revision management system 2 for actually executing file revision management includes a file manipulation monitoring section 21, a processing section 22 and a deleted file name memory section 23. The file manipulation monitoring section 21 and the processing section 22 are implemented by memory-resident software, for example. The-deleted file name memory section 23 is implemented by a storage unit such as memory, an HDD (Hard Disk Drive), etc. The memory-resident software for implementing the functions of the file manipulation monitoring section 21 and the processing section 22 can be supplied to the computer system by means of a record medium such as an FD (Floppy Disk), CD-ROM, ROM, etc. The operating system 3 is software for operating the computer system, such as "Windows 98" (Microsoft Corporation). The storage unit 4 is a fixed or removable storage unit such as an HDD, an FDD (Floppy-Disk Drive) including a floppy disk, etc.

Figure 2:
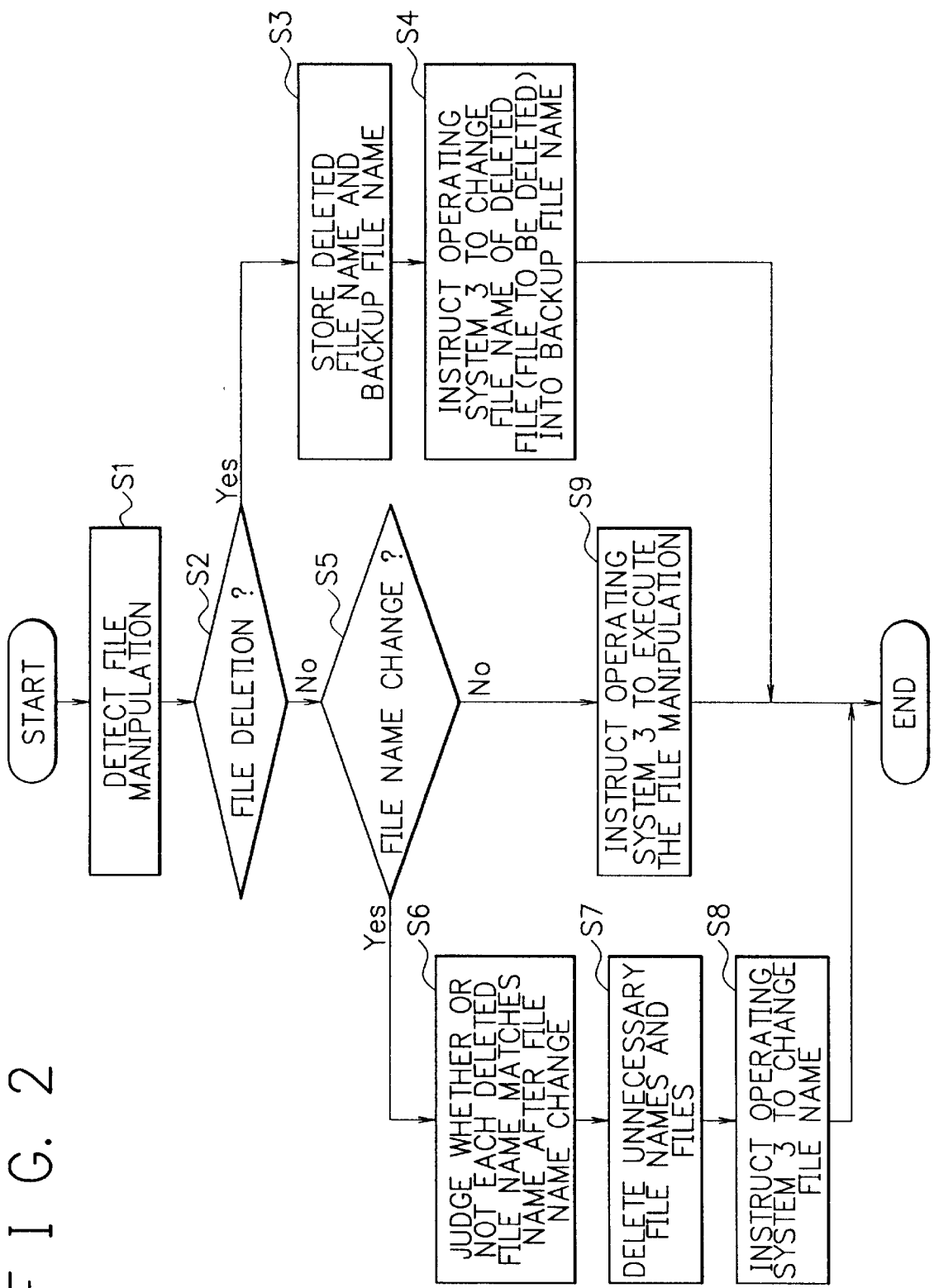
FIG. 2 is a flow chart showing the operation of the file revision management system shown in FIG. 1.

In the following, the operation of the file revision management system according to the embodiment of the present invention will be described in detail referring to FIG. 2. FIG. 2 is a flow chart showing the operation of the file revision management system shown in FIG. 1. Incidentally, the file revision management system 2 executes file revision management when a file which is being edited by the application 1 (i.e. which is being edited by a user of the application 1) is saved by the application 1 (according to a request of the user) by means of overwrite. In the file overwrite, the application 1 (word processor software, spreadsheet software, CAD software, etc.) generally generates the newest temporary file ("$$$.doc", for example) first in order to temporarily store the newest result of the file editing on the application 1. Subsequently, the application 1 generally tries to delete unnecessary temporary files ("tmp1.doc", "tmp2.doc", for example) which have been saved during the current editing session and an unnecessary original (old) file ("org.doc", for example) which has been saved at the end of the previous editing session (i.e. at the beginning of the current editing session). Thereafter, the application 1 tries to change the name of the newest temporary file ("$$$.doc") into the name of the original file (i.e. "org.doc"). Therefore, in the file overwrite operation, the application 1 executes "file deletion" (that is, the deletion of the unnecessary temporary files and the unnecessary original file) and "file name change" ("$$$.doc" into "org.doc", for example).

First, the file manipulation monitoring section 21 of the file revision management system 2 detects file manipulation which is going to be executed by the application 1 (step Si). The file manipulation monitoring section 21 constantly monitors API (Application Program Interface) commands which are outputted by the application 1 to the operating system 3 and thereby detects the file manipulation which is (going to be) executed by the application 1. At this stage, the file revision management system 2 (file manipulation monitoring section 21) hooks the API command outputted by the application 1 and does not send the API command to the operating system 3.

Subsequently, the file manipulation monitoring section 21 judges whether or not the file manipulation (to be) executed by the application 1 is "file deletion" based on the API command outputted by the application 1 (step S2). In the case where the file manipulation is "file deletion" ("Yes" in the step S2), the file manipulation monitoring section 21 instructs the processing section 22 to store a "deleted file name" and a corresponding "backup file name" in the deleted file name memory section 23 (step S3). The deleted file name is the name of the file (to be) deleted by the application 1. FIG. 3 shows an example of the deleted file names and the backup file names which are stored in the deleted file name memory section 23. Referring to FIG. 3, a backup file name is composed of three parts, for example. The first part is the deleted file name without the filename extension. The second part is information concerning the date (year, month, day) of the file deletion. The third part is information concerning the time (hour, minute) of the file deletion. The three parts are connected by "_", for example. The backup file name has a filename extension which is the same as that of the corresponding deleted file name. A deleted file name and a corresponding backup file name are stored in the deleted file name memory section 23 as a pair. Therefore, when a deleted file name is deleted from the deleted file name memory section 23, a corresponding backup file name is also deleted.

Subsequently, the processing section 22 changes the name of the deleted file (that is, the file to be deleted by the application 1) into the backup file name which has been determined in the step S3, instead of actually deleting the file from the storage unit 4. The file name change (instead of the file deletion) by the processing section 22 is executed by sending an API command for the file name change (instead of the API command outputted by the application 1) to the operating system 3 (step S4).

In the case where the file manipulation (to be) executed by the application 1 is not "file deletion" ("No" in the step S2), the process proceeds to step S5. In the step S5, the file manipulation monitoring section 21 judges whether or not the file manipulation (to be) executed by the application 1 is "file name change" based on the API command outputted by the application 1.

In the case where the file manipulation is "file name change" ("Yes" in the step S5), the processing section 22 refers to the deleted file names which have been stored in the deleted file name memory section 23 and judges whether or not each of the deleted file names stored in the deleted file name memory section 23 is the same as the file name after the file name change (step S6). With regard to deleted file names that did not match the file name after the file name change, the processing section 22 deletes the deleted file names and corresponding backup file names from the deleted file name memory section 23 and deletes files having the backup file names from the storage unit 4. The processing section 22 executes the file deletion from the storage unit 4 by sending API commands for the file deletion to the operating system 3. With regard to a deleted file name that matched the file name after the file name change, the processing section 22 also deletes the deleted file name and a corresponding backup file name from the deleted file name memory section 23 (step S7), and changes the name of the newest temporary file ("$$$.doc", for example) into the file name after the file name change (that is, into the original file name ("org.doc", for example)). The processing section 22 executes the file name change by sending an API command for the file name change to the operating system 3 (step S8).

In the case where the file manipulation is not "file name change" ("No" in the step S5), the file manipulation monitoring section 21 directly sends the API command (which has been outputted by the application 1) to the operating system 3 without changing the API command, thereby the file manipulation (other than "file deletion" and "file name change") requested by the application 1 is executed by the operating system 3 (step S9).

FIG. 4 is a schematic diagram showing a concrete example of the operation of the computer system of FIG. 1 including the file revision management system of this embodiment. The operation shown in FIG. 4 includes five steps T1~T5. The five steps T1~T5 will be explained below in detail.

[Step T1]

The name of the file that is edited by the application 1 is assumed to be "org.doc", for example. It is also assumed that the application 1 has just generated a temporary file "tmp1.doc". At this stage, two files "org.doc" and "tmp1.doc" have been stored in the storage unit 4.

[Step T2]

When the user of the application 1 ordered "save" (overwrite) of the file "org.doc" which has been edited and thereby the application 1 saves (overwrites) the file "org.doc", the application 1 first generates the newest temporary file "$$$.doc" for temporarily storing the newest result of the editing session on the application 1. Incidentally, the application 1 does not directly overwrite the file "org.doc" when the user ordered overwrite of the edited file "org.doc", but generally generates the newest temporary file "$$$.doc" first. The name of the newest temporary file "$$$.doc" will be changed into "org.doc" later (in step T5).

[Step T3]

Subsequently, the application 1 tries to delete the unnecessary temporary file "tmp1.doc", that is, the application 1 outputs an API command for deleting the unnecessary temporary file "tmp1.doc" to the operating system 3. The API command requesting the deletion of the temporary file "tmp1.doc" is detected and hooked by the file manipulation monitoring section 21, thereby a deleted file name "tmp1.doc" and a backup file name "tmp1__19980930__1729.doc" (indicating that the date and time of deletion of the file "tmp1.doc" is 17:29 of Sep. 30, 1998, for example) are stored by the processing section 22 in the deleted file name memory section 23. The date and time of the file deletion means the date and time indicating when an API command requesting the file deletion outputted by the application 1 is hooked by the file manipulation monitoring section 21, for example. Subsequently, the processing section 22 sends a different API command (requesting file name change from "tmp1.doc" to "tmp1__19980930__1729.doc") to the operating system 3, thereby the name of the temporary file "tmp1.doc" to be deleted from the storage unit 4 is changed into "tmp1__19980930__1729.doc". By the above operations, the file name change from "tmp1.doc" to "tmp1__19980930__1729.doc" is executed instead of actually deleting the contents of the unnecessary temporary file "tmp1.doc" from the storage unit 4, thereby the contents of the unnecessary temporary file "tmp1.doc" remains in the storage unit 4 as the backup file "tmp1__19980930__1729.doc". At this stage, the storage unit 4 is storing three files "org.doc", "tmp1__19980930__1729.doc" and "$$$.doc", and the deleted file name memory section 23 is storing the deleted file name "tmp1.doc" and the backup file name "tmp1__19980930__1729.doc"

[Step T4]

Subsequently, the application 1 tries to delete the original (old) file "org.doc", that is, the application 1 outputs an API command for deleting the file "org.doc" to the operating system 3. The API command requesting the deletion of the original file "org.doc" is detected and hooked by the file manipulation monitoring section 21, thereby a deleted file name "org.doc" and a backup file name "org__19980930__1730.doc" (indicating that the date and time of the deletion of the original file "org.doc" is 17:30 of Sep. 30, 1998, for example) are stored by the processing section 22 in the deleted file name memory section 23. Subsequently, the processing section 22 sends a different API command (requesting file name change from "org.doc" to "org__19980930__1730.doc") to the operating system 3, thereby the name of the original file "org.doc" to be deleted from the storage unit 4 is changed into "org__19980930__1730.doc". By the above operations, the file name change from "org-.doc" to "org__19980930__1730.doc" is executed instead of actually deleting the contents of the original file "org.doc" from the storage unit 4, thereby the contents of the original file "org.doc" remains in the storage unit 4 as the backup file "org__19980930__1730.doc". At this stage, the storage unit 4 is storing three files "org__19980930__1730.doc", "tmp1__19980930__1729.doc" and "$$$.doc", and the deleted file name memory section 23 is storing the deleted file names "tmp1.doc" and "org.doc" and the backup file names "tmp1__19980930__1729.doc" and "org__19980930__1730.doc".

[Step T5]

Subsequently, the application 1 tries to execute file name change from "$$$.doc" into "org.doc", that is, the application 1 outputs an API command for changing the file name "$$$.doc" into "org.doc" to the operating system 3. The API command, requesting the file name change from "$$$.doc" into "org.doc" is detected and hooked by the file manipulation monitoring section 21, thereby the processing section 22 refers to the deleted file names which have been stored in the deleted file name memory section 23 and judges whether or not each of the deleted file names stored in the deleted file name memory section 23 matches the file name after the file name change (i.e. "org.doc"). With regard to each deleted file name ("tmp1.doc") that did not match the file name after the file name change ("org.doc"), the processing section 22 deletes the deleted file name ("tmp1.doc") and a corresponding backup file name ("tmp1__19980930__1729.doc") from the deleted file name memory section 23 and deletes a file having the backup file name ("tmp1__19980930__1729.doc") from the storage unit 4. The file deletion from the storage unit 4 executed by the processing section 22 is implemented by sending API commands for the file deletion to the operating system 3. With regard to a deleted file name ("org.doc") that matched the file name after the file name change ("org.doc"), the processing section 22 also deletes the deleted file name ("org.doc") and a corresponding backup file name ("org__19980930__1730.doc") from the deleted file name memory section 23, and does not delete a file having the backup file name ("org__19980930__1730.doc") from the storage unit 4. Thereafter, the processing section 22 changes the name of the newest temporary file ("$$$.doc") into the file name after the file name change (i.e. into the original file name: "org.doc"). The file name change executed by the processing section 22 is implemented by sending an API command for the file name change to the operating system 3. Consequently, at this stage, the backup file "org__19980930__1730.doc" and the newest file "org.doc" remains in the storage unit 4, and no deleted file names and no backup file names remain in the deleted file name memory section 23.

By the operations described above, as well as the newest file "org.doc" as the result of the file save (overwrite), the backup file "org__19980930__1730.doc" as the result of the file revision management by the file revision management system of the embodiment of the present invention is automatically stored in the storage unit 4.

Incidentally, while the file revision management system 2 of the above explanation executed file revision management for only one application 1, it is also possible to let the file revision management system 2 execute file revision management for two or more applications 1. In such cases, the file revision management system 2 prepares two or more deleted file name memory sections 23 corresponding to the two or more applications 1. Each API command outputted by an application 1 to the operating system 3 includes an ID (IDentifier) for discriminating between the applications 1 operating on the operating system 3. The file manipulation monitoring section 21 of the file revision management system 2 recognizes the sender of each API command based on the ID included in the API command. The file revision management system 2 executes file revision management for each application 1 independently, based on the ID and using each deleted file name memory section 23 for each application 1.

It is also possible to let two or more file revision management systems 2 be started up corresponding to the two or more applications 1 operating on the operating system 3. In such cases, each file revision management system 2 executes file revision management for a corresponding application 1 respectively and independently.

As set forth hereinabove, in the file revision management system and the file revision management method according to the present invention, the API (Application Program Interface) commands for file manipulation which are outputted by the application 1 to the operating system 3 are monitored and hooked, and thereby file manipulation which is going to be executed by the application is detected. File manipulation necessary for the file revision management (such as file deletion and file name change for generating a backup file) and processes necessary for the file revision management are executed depending on the file manipulation which is going to be executed by the application which has been detected based on the API command outputted by the application 1. The file manipulation and processes necessary for the file revision management can be arranged and determined arbitrarily, and can be executed on each occurrence of the file manipulation by the application 1. Therefore, the file revision management for the files edited by the application 1 can be implemented even if the application 1 is not provided with functions for file revision management, and thereby file backup reliability of applications can be improved.

Further, file revision management for a plurality of applications can be executed automatically by a common file revision manager according to the present invention. Therefore, the efficiency of the file revision management for the applications can be improved. The user does not have to consider whether or not each application executes file revision management as its function. The wasteful repetition of file revision management operations between the applications can be avoided, and manufacturing cost of the applications can be reduced. In the file revision management system of the preferred embodiment, judgment on unnecessary temporary files is automatically executed and backup files for the unnecessary temporary files are deleted from the storage unit 4 automatically, and thereafter file revision management for the unnecessary temporary files are not executed. Therefore, waste of processing time and storage capacity of the computer system for the file revision management can be eliminated. The backup file name in the preferred embodiment included the date and time concerning the "file deletion", thereby handling of the files (sort, search, etc.) in the file revision management can be made easier and efficient.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A file revision management system for executing file revision management when an application which is operating on an operating system of a computer system saves a file by means of file overwrite, comprising:

a file manipulation monitoring means for monitoring and hooking API (Application Program Interface) commands which are outputted by the application to the operating system and thereby detecting file manipulation which is going to be executed by the application; and a processing means for executing file manipulation necessary for the file revision management such as file deletion and file name change for generating a backup file and processes necessary for the file revision management depending on the file manipulation which is going to be executed by the application which has been detected by the file manipulation monitoring means, wherein when the file manipulation detected by the file manipulation monitoring means is "file deletion" of a file having a name "An" which has been stored in a storage unit of the computer system, the processing means changes the name of the file "An" stored in the storage unit into a corresponding backup file name "Bn" instead of actually deleting the contents of the deleted file "An" from the storage unit, and stores the deleted file name "An" in a deleted file name memory means, and when the file manipulation detected by the file manipulation monitoring means is "file name change" from a file name "C" into a file name "D", the processing means judges whether or not each of the deleted file names "An" stored in the deleted file name memory means matches the file name "D" after the file name change, and regards a file in the storage unit corresponding to a deleted file name "An" that matched the file name "D" after the file name change as the object of reserve, and regards files in the storage unit corresponding to deleted file names "An" that did not match the file name "D" after the file name change as unnecessary temporary files.

2. A file revision management system as claimed in claim 1, wherein in the case where the file manipulation detected by the file manipulation monitoring means is "file name change", with regard to the unnecessary temporary files, the processing means deletes the unnecessary temporary files from the storage unit and deletes deleted file names "An" corresponding to the unnecessary temporary files from the deleted file name memory means, and with regard to the object of reserve, the processing means does not delete the object of reserve from the storage unit and deletes a deleted file name "An" corresponding to the object of reserve from the deleted file name memory means, and the processing means changes the file name of the newest temporary file which has been generated by the application for the file overwrite into the file name "D" after the file name change.

3. A file revision management system as claimed in claim 2, wherein:

when a deleted file name "An" is stored in the deleted file name memory means by the processing means, the processing means also stores the corresponding backup file name "Bn" in the deleted file name memory means, and when a deleted file name "An" is deleted from the deleted file name memory means by the processing means, the processing means also deletes the corresponding backup file name "Bn" from the deleted file name.

4. A file revision management system as claimed in claim 2, wherein the processing means executes the file deletion and the file name change with respect to the storage unit by sending API commands for the file deletion and the file name change to the operating system.

5. A file revision management system as claimed in claim 1, wherein the backup file name "Bn" includes the date and time concerning the "file deletion".

6. A file revision management system as claimed in claim 5, wherein the backup file name "Bn" further include part of the name "An" of the deleted file "An".

7. A file revision management system as claimed in claim 1, wherein the deleted file name memory means is implemented by memory of the computer system.

8. A file revision management system as claimed in claim 1, wherein the deleted file name memory means is implemented by an HDD (Hard Disk Drive) of the computer system.

9. A file revision management system as claimed in claim 1, wherein:

when the file manipulation detected by the file manipulation monitoring means is "file deletion" of a file which has been stored in a storage unit of the computer system, the processing means changes the name of the file stored in the storage unit into a corresponding backup file name instead of actually deleting the contents of the deleted file from the storage unit.

10. A file revision management system as claimed in claim 1, wherein:

the file manipulation monitoring means judges which of two or more applications operating on the computer system outputted the API command based on an ID (IDentifier) included in the API command, and the processing means executes the file manipulation and the processes necessary for the file revision management for the two or more applications simultaneously and independently based on the ID.

11. A file revision management system as claimed in claim 1, wherein the file revision management system is started up on the computer system for each of a plurality of applications operating on the operating system, independently and simultaneously.

12. A file revision management method for executing file revision management when an application which is operating on an operating system of a computer system saves a file by means of file overwrite, comprising the steps of:

a file manipulation monitoring step in which API (Application Program Interface) commands which are outputted by the application to the operating system are monitored and hooked and thereby file manipulation which is going to be executed by the application is detected; and a processing step in which file manipulation necessary for the file revision management such as file deletion and file name change for generating a backup file and processes necessary for the file revision management are executed depending on the file manipulation which is going to be executed by the application which has been detected in the file manipulation monitoring step, wherein when the file manipulation detected in the file manipulation monitoring step is "file deletion" of a file having a name "An" which has been stored in a storage unit of the computer systems the name of the file "An" stored in the storage unit is changed into a corresponding backup file name "Bn" instead of actually deleting the contents of the deleted file "An" from the storage unit, and the deleted file name "An" is stored in a deleted file name memory means, and when the file manipulation detected in the file manipulation monitoring step is "file name change" from a file name "C" into a file name "D", it is judged whether or not each of the deleted file names "An" stored in the deleted file name memory means matches the file name "D" after the file name change, and a file in the storage unit corresponding to a deleted file name "An" that matched the file name "D" after the file name change is regarded as the object of reserve, and files in the storage unit corresponding to deleted file names "An" that did not match the file name "D" after the file name change are regarded as unnecessary temporary files.

13. A file revision management method as claimed in claim 12, wherein in the processing step, in the case where the file manipulation detected in the file manipulation monitoring step is "file name change", the unnecessary temporary files are deleted from the storage unit and deleted file names "An" corresponding to the unnecessary temporary files are deleted from the deleted file name memory means, and the object of reserve is not deleted from the storage unit and a deleted file name "An" corresponding to the object of reserve is deleted from the deleted file name memory means, and the file name of the newest temporary file which has been generated by the application for the file overwrite is changed into the file name "D" after the file name change.

14. A file revision management method as claimed in claim 13, wherein in the processing step:

when a deleted file name "An" is stored in the deleted file name memory means, the corresponding backup file name "Bn" is also stored in the deleted file name memory means, and when a deleted file name "An" is deleted from the deleted file name memory means, the corresponding backup file name "Bn" is also deleted from the deleted file name memory means.

15. A file revision management method as claimed in claim 13, wherein the file deletion and the file name change which are executed in the processing step with respect to the storage unit are implemented by sending API commands for the file deletion and the file name change to the operating system.

16. A file revision management method as claimed in claim 12, wherein the backup file name "Bn" includes the date and time concerning the "file deletion".

17. A file revision management method as claimed in claim 16, wherein the backup file name "Bn" further includes part of the name "An" of the deleted file "An".

18. A file revision management method as claimed in claim 12, wherein the deleted file name memory means is implemented by memory of the computer system.

19. A file revision management method as claimed in claim 12, wherein the deleted file name memory means is implemented by an HDD (Hard Disk Drive) of the computer system.

20. A file revision management method as claimed in claim 12, wherein in the processing step:

when the file manipulation detected in the file manipulation monitoring step is "file deletion" of a file which has been stored in a storage unit of the computer system, the name of the file stored in the storage unit is changed into a corresponding backup file name instead of actually deleting the contents of the deleted file from the storage unit.

21. A file revision management method as claimed in claim 12, wherein:

in the file manipulation monitoring step, it is judged which of two or more applications operating on the computer system outputted the API command, based on an ID (IDentifier) included in the API command, and in the processing step, the file manipulation and the processes necessary for the file revision management are executed for the two or more applications simultaneously and independently based on the ID.

22. A file revision management method as claimed in claim 12, wherein the file revision management method is executed for each of a plurality of applications operating on the operating system, independently and simultaneously.

23. A computer-readable record medium storing a program for instructing a computer system to execute a file revision management method when an application which is operating on an operating system of the computer system saves a file by means of file overwrite, wherein the file revision management method includes the steps of:

a file manipulation monitoring step in which API (Application Program Interface) commands which are outputted by the application to the operating system are monitored and hooked and thereby file manipulation which is going to be executed by the application is detected; and a processing step in which file manipulation necessary for the file revision management such as file deletion and file name change for generating a backup file and processes necessary for the file revision management are executed depending on the file manipulation which is going to be executed by the application which has been detected in the file manipulation monitoring step, wherein when the file manipulation detected in the file manipulation monitoring step is "file deletion" of a file having a name "An" which has been stored in a storage unit of the computer system, the name of the file "An" stored in the storage unit is changed into a corresponding backup file name "Bn" instead of actually deleting the contents of the deleted file "An" from the storage unit, and the deleted file name "An" is stored in a deleted file name memory means, and when the file manipulation detected in the file manipulation monitoring step is "file name change" from a file name "C" into a file name "D", it is judged whether or not each of the deleted file names "An" stored in the deleted file name memory means matches the file name "D" after the file name change, and a file in the storage unit corresponding to a deleted file name "An" that matched the file name "D" after the file name change is regarded as the object of reserve, and files in the storage unit corresponding to deleted file names "An" that did not match the file name "D" alter the file name change are regarded as unnecessary temporary files.

24. A computer-readable record medium as claimed in claim 23, wherein in the processing step, in the case where the file manipulation detected in the file manipulation monitoring step is "file name change", the unnecessary temporary files are deleted from the storage unit and deleted file names "An" corresponding to the unnecessary temporary files are deleted from the deleted file name memory means, and the object of reserve is not deleted from the storage unit and a deleted file name "An" corresponding to the object of reserve is deleted from the deleted file name memory means, and the file name of the newest temporary file which has been generated by the application for the file overwrite is changed into the file name "D" after the file name change.

25. A computer-readable record medium as claimed in claim 24, wherein in the processing step:
   when a deleted file name "An" is stored in the deleted file name memory means, the corresponding backup file name "Bn" is also stored in the deleted file name memory means, and
   when a deleted file name "An" is deleted from the deleted file name memory means, the corresponding backup file name "Bn" is also deleted from the deleted file name memory means.

26. A computer-readable record medium as claimed in claim 24, wherein the file deletion and the file name change which are executed in the processing step with respect to the storage unit are implemented by sending API commands for the file deletion and the file name change to the operating system.

27. A computer-readable record medium as claimed in claim 23, wherein the backup file name "Bn" includes the date and time concerning the "file deletion".

28. A computer-readable record medium as claimed in claim 27, wherein the backup file name "Bn" further includes part of the name "An" of the deleted file "An".

29. A computer-readable record medium as claimed in claim 23, wherein the deleted file name memory means is implemented by memory of the computer system.

30. A computer-readable record medium as claimed in claim 23, wherein the deleted file name memory means is implemented by an HDD (Hard Disk Drive) of the computer system.

31. A computer-readable record medium as claimed in claim 23, wherein in the processing step:
   when the file manipulation detected in the file manipulation monitoring step is "file deletion" of a file which has been stored in a storage unit of the computer system, the name of the file stored in the storage unit is changed into a corresponding backup file name instead of actually deleting the contents of the deleted file from the storage unit.

32. A computer-readable record medium as claimed in claim 23, wherein:
   in the file manipulation monitoring step, it is judged which of two or more applications operating on the computer system outputted the API command, based on an ID (IDentifier) included in the API command, and
   in the processing step, the file manipulation and the processes necessary for the file revision management are executed for the two or more applications simultaneously and independently based on the ID.

33. A computer-readable record medium as claimed in claim 23, wherein the file revision management method is executed for each of a plurality of applications operating on the operating system, independently and simultaneously.

* * * * *